(12) United States Patent
Greif (10) Patent No.: US 11,618,219 B2
(45) Date of Patent: Apr. 4, 2023

(54) WELDING DEVICE AND METHOD FOR WELDING AN OUTLET ELEMENT TO A PACKAGING MATERIAL

(71) Applicant: Syntegon Technology GmbH, Waiblingen (DE)

(72) Inventor: Tobias Greif, Waiblingen (DE)

(73) Assignee: Syntegon Technology GmbH, Waiblingen (DE)

( * ) Notice: Subject to any disclaimer, the term of this patent is extended or adjusted under 35 U.S.C. 154(b) by 14 days.

(21) Appl. No.: 17/336,476

(22) Filed: Jun. 2, 2021

(65) Prior Publication Data
US 2021/0379839 A1 Dec. 9, 2021

(30) Foreign Application Priority Data
Jun. 5, 2020 (DE) ...................... 10 2020 115 036.9

(51) Int. Cl.
*B29C 65/08* (2006.01)
*B29C 65/00* (2006.01)

(52) U.S. Cl.
CPC ............ *B29C 65/08* (2013.01); *B29C 66/432* (2013.01); *B29C 66/53245* (2013.01);
(Continued)

(58) Field of Classification Search
CPC ............ B29C 65/7457; B29C 66/8432; B29C 66/5324; B29C 66/63; B29C 66/53241;
(Continued)

(56) References Cited

U.S. PATENT DOCUMENTS 5,024,645 A * 6/1991 Soubrier ................. B29C 65/02
227/111
5,110,041 A * 5/1992 Keeler .................. B29C 65/526
222/545
(Continued)

FOREIGN PATENT DOCUMENTS

DE 7833456 U1 11/1979
EP 1464474 A2 10/2004
WO 2008092714 A1 8/2008

OTHER PUBLICATIONS

European Patent Office Action for Application No. 21176248.9 dated Nov. 17, 2021 (10 pages including English translation).
(Continued)

*Primary Examiner* — Scott W Dodds
(74) *Attorney, Agent, or Firm* — Michael Best & Friedrich LLP (57) ABSTRACT

A welding device (10*a*; 10*b*) for welding an outlet element (12*a*; 12*b*) to a packaging material (14*a*; 14*b*) has at least one anvil (16*a*; 16*b*) comprising at least one receiving region (18*a*; 18*b*) for receiving the outlet element (12*a*; 12*b*) that is to be welded, has a holding element (20*a*; 20*b*) which the anvil (16*a*; 16*b*) is arranged on, and at least one welding die (22*a*; 22*b*), in particular a sonotrode, which is configured to interact with the anvil (16*a*; 16*b*) for a welding of the outlet element (12*a*; 12*b*) to the packaging material (14*a*; 14*b*), wherein the welding device (10*a*; 10*b*) comprises at least one support unit (24*a*; 24*b*) for supporting the anvil (16*a*; 16*b*), comprising at least one movably supported support element (26*a*; 26*b*), which is configured to exert a holding force onto the anvil (16*a*; 16*b*) in a welding operation state of the welding die (22*a*; 22*b*).

16 Claims, 3 Drawing Sheets

(52) U.S. Cl.
CPC ...... *B29C 66/8242* (2013.01); *B29C 66/8322* (2013.01); *B29C 66/8511* (2013.01)

(58) Field of Classification Search
CPC ........ B29C 66/53242; B29C 66/53243; B29C 66/53245; B29C 66/53246; B29C 66/53247
See application file for complete search history.

(56) References Cited

U.S. PATENT DOCUMENTS

| | | | |
|---|---|---|---|
| 5,819,504 A | | 10/1998 | Giacomelli et al. |
| 6,145,275 A | * | 11/2000 | Sweeney ............... B29C 66/112 53/133.4 |
| 2006/0080944 A1 | | 4/2006 | Annehed et al. |
| 2007/0251978 A1 | * | 11/2007 | Konieczka ........ B29C 66/92651 228/1.1 |
| 2017/0291354 A1 | * | 10/2017 | Abt .................. B29O 66/72328 |

OTHER PUBLICATIONS

European Patent Office Search Report for Application No. 21176248.9 dated Nov. 5, 2021 (7 pages including English translation).
German Patent Office Search Report for Application No. DE 102020115036.9 dated Jan. 13, 2021 (12 pages including English translation).

* cited by examiner

WELDING DEVICE AND METHOD FOR WELDING AN OUTLET ELEMENT TO A PACKAGING MATERIAL

BACKGROUND

A welding device for welding an outlet element to a packaging material has already been disclosed, with at least one anvil comprising at least one receiving region for receiving the outlet element that is to be welded, with a holding element which the anvil is arranged on, and with at least one welding die which, for a welding of the outlet element to the packaging material, is configured to interact with the anvil.

SUMMARY

The invention is based on a welding device for welding an outlet element, in particular a valve, to a packaging material, with at least one anvil comprising at least one receiving region for receiving the outlet element that is to be welded, with an, in particular self-supporting, holding element which the anvil is arranged on, and with at least one welding die, in particular a sonotrode, which is configured to interact with the anvil for a welding of the outlet element to the packaging material.

It is proposed that the welding device comprises at least one support unit for supporting the anvil, comprising at least one movably supported support element, which is configured to exert a holding force onto the anvil in a welding operation state of the welding die.

Preferably the support element comprises at least one movement axis, along which and/or around which the support element is supported movably, in particular relative to the holding element and/or to the anvil. Preferentially the movement axis is aligned at least substantially perpendicularly to a main extension axis of the holding element. The term "substantially perpendicularly" is here in particular intended to define an orientation of a direction relative to a reference direction, wherein the direction and the reference direction, in particular viewed in a projection plane, include an angle of 90°, the angle having a maximum deviation that is in particular smaller than 8°, advantageously smaller than 5° and especially advantageously smaller than 2°. By a "main extension axis" of an object is herein in particular an axis to be understood which extends parallel to a longest edge of a smallest geometrical rectangular cuboid just still completely enclosing the object. Preferably the support element is supported so as to be linearly movable along the movement axis. It is alternatively also conceivable that the support element is, for example, supported eccentrically around the movement axis. The support unit is implemented, for example, as a hydraulic unit, as a pneumatic unit, as a servo drive unit, or the like. The support element is implemented, for example, as a piston, in particular a hydraulic piston, a pneumatic piston, or something like that. In particular, the support unit comprises at least one cylinder, in particular a hollow cylinder, on and/or in which the support element is supported movably, in particular along and/or around the movement axis of the support element. It is alternatively also conceivable that the support unit comprises at least one spring element, for example a leaf spring, a spiral spring, or the like, which is configured to exert a holding force onto the anvil. The holding element is preferably arranged between the support unit and the welding die. The anvil is in particular arranged between the holding element and the support unit.

By an object being intended or configured for a certain function is in particular to be understood that the object fulfills and/or carries out said certain function in at least one application state and/or operation state. The support unit, in particular the support element of the support unit, is configured, at least during the welding process, to hold the anvil in the welding position by means of a holding force exerted onto the anvil. By a "self-supporting" element is in particular an element to be understood which is clamped-in, fixated, fastened, or the like, on one side only. The holding element is preferably free of a fix support or a connection point or a bearing point at least in a region of the anvil. Preferentially the holding element has a free end and a fixated or clamped-in end. The holding element may, for example, be realized as a holding arm or something like that.

In the welding operation state preferably at least the welding die and the anvil are arranged in a welding position. The welding die is preferably configured for welding the outlet element to the packaging material if the welding die and the anvil are arranged in the welding position. In particular, the welding die is configured for welding the outlet element to the packaging material on a side of the packaging material that faces toward the welding die or on a side of the packaging material that faces away from the welding die. In the welding operation state the outlet element is welded to the packaging material. The welding position is in particular defined by a relative arrangement, preferably by a relative distance, of the anvil to the welding die, which enables a welding of the outlet element to the packaging material. The welding device is preferentially implemented as an ultrasound welding device. Preferably the welding die is implemented as a sonotrode. It is however also conceivable that the welding device is implemented as a heat contact welding device, in particular with a heat die, as an induction welding device, as an impulse welding device, as a circular welding device, as a laser transmission welding device, or the like.

The outlet element is preferably at least configured for letting a fluid pass at least along an outlet direction. The outlet element may be implemented, for example, as a valve, in particular as an aroma protection valve, as an outlet opening, as a closure, or something like that. The packaging material is preferably at least intended to be processed into bag packagings or similar packagings, in particular by means of a packaging machine. The packaging machine particularly preferably comprises at least the welding device. The packaging material in particular forms a flat packaging matter web. The packaging material is in particular present in an at least once-folded form before the welding process carried out by the welding device. The packaging material is preferably at least configured, at least prior to the welding process by the welding device, to be unfolded at least partly by an opening angle. The opening angle is preferably at least smaller than 25°, preferentially at least smaller than 15° and especially preferentially at least smaller than 10°. The welding device preferably comprises at least one material conveying track, which is at least configured for feeding the packaging material to the welding die and to the anvil and for conveying the packaging material away from the welding die and the anvil after the welding process. A material conveying axis of the material conveying track in particular runs at least substantially perpendicularly to a feeding direction of an outlet element feeding unit and/or perpendicularly to the movement axis of the support element. The packaging material preferably has a packaging material movement axis, along which the packaging material is movable. The packaging material movement axis preferentially runs at least substantially parallel to the material conveying axis of the material conveying track. The material conveying track may, for example, be implemented at least partially by the holding element or may be implemented separately from the holding element.

The welding device preferably comprises the aforementioned outlet element feeding unit, which is at least configured for feeding at least the outlet element to the receiving region of the anvil. The receiving region is preferably arranged on an anvil upper side of the anvil. The anvil upper side is preferentially arranged on the anvil on a side of the anvil that faces toward the welding die. The anvil upper side is preferably arranged on the anvil on a side of the anvil that faces away from the support unit. The receiving region is in particular formed by the anvil upper side of the anvil. The receiving region formed by the anvil upper side is particularly preferably implemented with a perfect fit to the outlet element. In particular, in at least one operation state the outlet element feeding unit is arranged on a side of the packaging material that faces toward the welding die or on a side of the packaging material that faces away from the welding die. The outlet element feeding unit is preferably arranged on the holding element. The outlet element feeding unit preferentially comprises at least one guiding element, wherein the outlet element is configured, when fed into the receiving region of the anvil, to be guided along the guiding elements. Preferably the guiding element is configured for guiding a plurality of outlet elements. The outlet elements of the plurality of outlet elements are in particular arrangeable, preferably on the guiding element, loosely with respect to one another in a row one behind the other one, or they form a contiguous train of outlet elements. Preferentially the guiding element is implemented as a guiding rail or something like that. It is conceivable that the guiding element is realized integrally with the holding element. "Integrally" is in particular to mean connected at least by substance-to-substance bond, for example by a welding process, a gluing process, an injection-molding process, and/or a different process that is deemed expedient by someone skilled in the art, and/or advantageously formed in one piece, like for example by a production from a cast and/or by a production in a one-component or multi-component injection-molding procedure, and advantageously from a single blank. It is also conceivable that the outlet element feeding unit, in particular the guiding element, is implemented and/or arranged separately from the holding element. The feeding direction of the outlet element feeding unit preferably extends at least partially parallel to the main extension axis of the holding element and/or at least partially perpendicularly to the movement axis of the support element.

It is advantageously possible to provide a compact welding device. Advantageously a usage of a particularly flat anvil can be realized. Advantageously a particularly complication-free processing of the packaging material, in particular following the welding process, is enabled. In an unfolding of the packaging material prior to the welding process, the opening angle can be kept advantageously small. Advantageously a particularly precise welding process is enabled.

It is moreover proposed that the anvil is supported movably on the holding element and can be subjected to a holding force toward the welding die by means of the support element. The anvil is supported movably on the holding element for example by means of a linear roller bearing, a linear slide bearing or something like that. In particular, the anvil has an anvil movement axis, the anvil being supported movably along and/or around the anvil movement axis on the holding element. Preferably the anvil movement axis runs at least substantially perpendicularly to the main extension axis of the holding element. Preferentially the anvil movement axis runs at least substantially parallel to the movement axis of the support element of the support unit. "Substantially parallel" is here in particular to mean an orientation of a direction relative to a reference direction, in particular in a plane, wherein the direction has a deviation from the reference direction that is in particular smaller than 8°, advantageously smaller than 5° and especially advantageously smaller than 2°. Particularly preferably the anvil is supported such that it is linearly movable along the anvil movement axis. Preferably the support unit is configured for moving the anvil into the welding position by means of the support element prior to the welding process. It is conceivable that the relative arrangement of the anvil with respect to the welding die, in particular a distance between the anvil and the welding die, changes during the welding process, preferably due to a melting of a sealing surface of the outlet element. Especially preferentially the support unit is configured to hold the anvil in the welding position by the support element during the welding process. Especially preferentially the support unit is configured, by means of the support element, to adapt the arrangement of the anvil relative to the welding die to the melting of the sealing surface of the outlet element. Preferably, at least in the welding operation state the anvil upper side of the anvil is arranged spaced apart from the guiding element of the outlet element feeding unit, in particular viewed along the anvil movement axis of the anvil. It is in this way advantageously possible to counteract a damaging of further outlet elements, which are arranged on the guiding element, by the welding process. The support element is configured to move after the welding process into an initial position relative to the support unit. Preferably the anvil is in the initial position of the support element free of a force exerted by the support element. Preferentially the anvil is configured, after a welding process, to be moved into an outlet element feeding position, in particular if the support element is situated in the initial position and/or if the support element does not exert a holding force onto the anvil. The anvil preferentially comprises at least one movement unit, which is at least configured for moving the anvil into the outlet element feeding position. The movement unit is preferably implemented in a pneumatic manner. It is alternatively also conceivable that the movement unit is implemented electrically, mechanically or the like. For example, it is alternatively conceivable that the movement unit comprises at least one spring element or something like that, which is configured for a resetting of the anvil into the outlet element feeding position. The spring element may be implemented, for example, as a spiral spring, as a leaf spring, or the like. The outlet element feeding unit is configured for feeding the outlet element to the receiving region of the anvil at least in the outlet element feeding position of the anvil. A precise welding process, and at the same time a compact construction of the anvil, may advantageously be ensured.

Furthermore it is proposed that the support unit comprises at least one hydraulic cylinder, a pneumatic cylinder, or a servo drive for a movement of the support element. Preferentially the hydraulic cylinder, the pneumatic cylinder, or the servo drive is configured for moving the support element along the movement axis of the support element. Especially preferentially the hydraulic cylinder, the pneumatic cylinder, or the servo drive is configured for moving the support element in such a way that the anvil is moved into the welding position by an interaction with the support element.

Preferentially the hydraulic cylinder, the pneumatic cylinder, or the servo drive is configured to move and/or to hold the support element in such a way that the anvil can be held in the welding position during the welding process. The hydraulic cylinder, the pneumatic cylinder, or the servo drive is configured, at least following the welding process, to move the support element into the initial position of the support element. Advantageously an especially comfortable processing of the packaging material may be facilitated. Advantageously a precise welding process is enabled. Advantageously, a melting of the sealing surface of the outlet element during the welding process can be taken into account by a movement of the anvil, thus allowing a precise welding.

It is moreover proposed that the support unit is arranged relative to the holding element in such a way that the packaging material is arrangeable between the support element and the holding element. The support element of the support unit is preferably arrangeable relative to the holding element in such a way that in at least one state there is a gap between the support unit and the holding element. The packaging material is preferably movable in the gap between the support element and the holding element. Preferentially the anvil and the support element of the support unit are arrangeable relative to each other in such a way that the anvil and the support element are spaced apart from each other. Especially preferably the packaging material is arrangeable between the anvil and the support element; in particular, the packaging material is arranged between the anvil and the support element, particularly preferably clamped-in between the anvil and the support element, at least during the welding process. The anvil is particularly preferably arrangeable relative to the support element in such a way that the packaging material is movable between the anvil and the support element. The packaging material is in particular movable at least between the anvil and the support element if the support element is in an initial position. Preferentially the packaging material is configured to be moved, in particular via the material conveying track, between the anvil and the support element at least between two successive welding processes. During the welding process the packaging material is preferably arranged between the welding die and the holding element, and between the holding element and the support unit. In particular, during the welding process the packaging material is situated between the anvil and the welding die, and between the anvil and the support element. Advantageously an especially compact welding device can be provided. Advantageously a utilization of a particularly flat anvil can be enabled at the same time as a precise welding process. The opening angle of the packaging material before the welding process may advantageously be kept particularly small.

Beyond this it is proposed that the anvil comprises an anvil support surface, which is at least configured to interact with the support element for a support of the anvil, wherein a maximum extent of the anvil support surface is larger than a maximum extent of the receiving region of the anvil. The anvil support surface is preferably arranged on the anvil on a side of the anvil that faces toward the support element of the support unit. The packaging material in particular adjoins the anvil support surface at least in the welding operation state. The anvil support surface is preferentially arranged on an anvil underside of the anvil. The anvil underside is in particular arranged facing away from the anvil upper side of the anvil. The support element in particular comprises at least one support surface, which is at least configured to interact with the anvil support surface for a support of the anvil. In particular, the support surface is situated opposite the anvil support surface. The packaging material preferably adjoins the support surface at least in the welding operation state. The anvil support surface particularly preferably extends parallel to the support surface, in particular at least in the welding operation state. Preferentially a maximum extent of the support surface corresponds to the maximum extent of the anvil support surface. It is however also conceivable that the maximum extent of the anvil support surface is smaller or larger than the maximum extent of the support surface of the support element. Advantageously a utilization of a particularly flat anvil can be realized and at the same time a damaging of the packaging material can be obviated by a support of the anvil provided by the support unit.

It is further proposed that the welding device comprises at least one punching unit, which is at least configured for introducing a perforation into the packaging material, wherein the punching unit is arranged at least partly on the welding die. Preferentially the punching unit is arranged at least partly within the welding die. Preferably the welding die comprises at least one recess, in which the punching unit, in particular at least one punching tool of the punching unit, is arrangeable. It is alternatively also conceivable that the punching unit is at least partly arranged on an outer side of the welding die. In particular, the punching unit comprises at least the punching tool. The punching tool is particularly preferably implemented as a hole-punching tool. It is however also conceivable that the punching tool is implemented as a different punching tool, which is known to someone skilled in the art. Preferably the punching tool is supported movably on the welding die. A punching tool movement axis of the punching tool preferably runs parallel to the movement axis of the support element and/or to the anvil movement axis of the anvil. The punching unit is in particular configured for introducing the perforation into the packaging material by means of the punching tool. For an introduction of the perforation into the packaging material, the punching unit is preferably configured to move the punching tool relative to the packaging material, in particular toward the packaging material. It is also conceivable that the punching unit comprises at least one further punching tool, which is in particular arranged on the holding element or on the anvil. The further punching tool is in particular configured to divide the contiguous train of outlet elements, preferably into individual outlet elements. The further punching tool is preferentially fixated on the anvil or on the holding element. Preferably the further punching tool is configured to sever the contiguous train of outlet elements by a movement of the anvil relative to the holding element. In particular, an edge of the anvil, respectively of the holding element, forms a punching edge for the further punching tool. It is in particular conceivable that in at least one exemplary embodiment, in which the further punching tool is arranged on the anvil, a punching tool movement axis of the further punching tool preferably runs at least substantially parallel to the punching tool movement axis of the punching tool and/or to the anvil movement axis. The further punching tool is preferably implemented as a punching knife or as a punching edge. It is however conceivable that the further punching tool is implemented as a different punching tool known to someone skilled in the art. It is advantageously possible to provide a compact welding device having a high level of functionality. Advantageously a welding device can be equipped with a punching unit without significantly augmenting the space requirement of the welding device.

Furthermore, a method is proposed for welding an outlet element, in particular the already aforementioned outlet element, to a packaging material, in particular the already aforementioned packaging material, by means of a welding device according to the invention. Preferably the at least once-folded packaging material is unfolded by the opening angle prior to the welding process. In at least one method step the packaging material, which is in particular unfolded by the opening angle, is conveyed into the welding device and/or conveyed in the welding device. Preferably in at least one method step the outlet element is arranged in the receiving region of the anvil. Preferably the outlet element is moved along the guiding element in the feeding direction until the outlet element is situated in the receiving region of the anvil. In particular, the outlet element is in at least one method step welded to the packaging material. Preferably the outlet element is welded to the packaging material in an ultrasound welding procedure. It is alternatively also conceivable that the outlet element is welded to the packaging material in a heat contact welding procedure, in particular with a heat die, in an induction welding procedure, in an impulse welding procedure, in a circular welding procedure, in a laser transmission welding procedure, or the like. Preferentially the packaging material is folded at least once after the welding process. Advantageously a processing of the packaging material can be ensured that is particularly low in complication. Advantageously a precise welding process is enabled at the same time as a simple packaging material guidance. Advantageously a movement of the anvil generated by means of the support unit can be used for a punching of the packaging material and/or of the contiguous train of outlet elements. It is possible to integrate a punching unit into the welding device in a compact, structurally simple manner.

It is further proposed that in at least one method step the packaging material is arranged between the anvil of the welding device and the support unit of the welding device. Preferably the packaging material is moved between the anvil and the support unit, in particular the support element of the support unit, before and/or after the welding process. Preferentially the packaging material is in at least one method step arranged between the anvil and the welding die. Particularly preferentially the packaging material is moved between the anvil and the welding die before and/or after the welding process. The packaging material movement axis in particular runs at least substantially perpendicularly to the movement axis of the support element, to the anvil movement axis, to the feeding direction of the outlet element feeding unit and/or to the punching tool movement axis. Advantageously, in the unfolding of the packaging material the opening angle can be kept especially small. Advantageously a precise welding process is achievable together with a compact welding device.

Moreover it is proposed that in at least one method step the anvil and the support element of the support unit are moved relative to one another. Preferably the support element is moved in at least one method step along the movement axis of the support element. In particular, the support element is moved toward the anvil, at least for the purpose of establishing an operative connection of the support element with the anvil. Preferably, in particular after a welding process, the support element is moved along the movement axis of the support element in a direction away from the anvil in order to create a distance between the anvil and the support element, particularly preferably in order to enable a movement of the packaging material between the anvil and the support element. Preferentially, in particular if there is an operative connection between the anvil and the support element, the anvil is moved into the welding position before the welding process by means of the support unit, preferably by means of the support element of the support unit. Advantageously, for the purpose of realizing a precise welding of the outlet element to the packaging material, a support of the anvil is advantageously achievable by the support element.

Furthermore it is proposed that in at least one method step the outlet element is welded to the packaging material, wherein the anvil is supported by the support element and the packaging material is arranged between the support element and the anvil. Preferably the anvil is supported by the support element at least during the welding process. Preferably, at least during the welding process the packaging material is clamped-in between the anvil and the support element, in particular between the support surface of the support element and the anvil support surface of the anvil. It is advantageously possible that the outlet element is precisely welded to the packaging material by an especially flat anvil.

It is also proposed, in particular in at least one exemplary embodiment, that in at least one method step a contiguous train of outlet elements, in particular the already aforementioned contiguous train of outlet elements, is severed by an interaction of the support element with the anvil. Preferably the contiguous train of outlet elements is severed by a movement of the anvil relative to the holding element. Particularly preferably the contiguous train of outlet elements is severed such that there is at least one single outlet element present separately from the contiguous train of outlet elements, wherein said single outlet element is in particular arranged in the receiving region of the anvil. Preferably, in at least one exemplary embodiment, in which the punching tool is arranged on the holding element, the contiguous train of outlet elements is severed in at least one point by the movement of the anvil relative to the further punching tool. In at least one alternative exemplary embodiment, in which the further punching tool is fixated on the anvil, it is also conceivable that the contiguous train of outlet elements is severed in at least one point by the movement of the further punching tool relative to the holding element and/or to the contiguous train of outlet elements. Preferably the contiguous train of outlet elements is moved by means of the outlet element feeding unit. Particularly preferably the contiguous train of outlet elements is moved along the guiding element of the outlet element feeding unit. A relative movement of the anvil with respect to the holding element can advantageously be used for an operation of a punching unit. A severing of the contiguous train of outlet elements may be enabled in an advantageously simple manner.

Beyond this it is proposed that in at least one method step a perforation is introduced into the packaging material. Preferably, in at least one method step the punching tool of the punching unit is moved relative to the welding die. In particular, in at least one method step the punching tool is moved toward the anvil and/or toward the packaging material in order to introduce the perforation into the packaging material. Preferably the perforation is introduced into the packaging material in a state when the anvil is not supported by the support element. It is however also conceivable that the perforation is introduced into the packaging material in a state when the anvil is supported by the support element. Advantageously a perforation can be introduced into a packaging material by means of a welding device without essentially augmenting the space requirement of the latter. Advantageously it is possible that at least partly already existing components of the welding device are utilized for a perforation of a packaging material.

It is further proposed that in at least one method step the anvil is moved into an outlet element feeding position, in particular the already aforementioned outlet element feeding position. Preferably the anvil is moved, in particular by means of the movement unit, into the outlet element feeding position after the welding process. Especially preferentially the anvil is moved into the outlet element feeding position automatically for as long as the support element is arranged spaced apart from the anvil. Preferably the holding force exerted onto the anvil by the support element is directed in a direction that is opposed to a direction of a reset force generated by the movement unit. A low-complication, comfortable welding process can be ensured in an advantageously structurally simple manner.

Furthermore a packaging machine is proposed for a production of packagings with an outlet element, in particular the already aforementioned outlet element, with a welding device according to the invention. The packaging machine comprises at least one packaging material conveying unit, which is at least configured to feed a packaging material to the welding device prior to the welding process. The packaging material conveying unit is at least configured to convey the packaging material away from the welding device after the welding of the outlet element to the packaging material. The packaging machine preferably comprises at least one folding station, in which the packaging material is folded at least once. The packaging material conveying unit is in particular at least configured to unfold the packaging material at least by the opening angle prior to feeding it into the welding device. It is advantageously possible to provide a packaging machine that is particularly low in complication.

The welding device according to the invention, the method according to the invention and/or the packaging machine according to the invention shall herein not be limited to the application and implementation described above. In particular, to fulfill a functionality that is mentioned here, the welding device according to the invention, the method according to the invention and/or the packaging machine according to the invention may comprise a number of individual elements, component and units as well as method steps that differs from a number given here. Furthermore, regarding the value ranges given in the present disclosure, values situated within the limits given shall also be considered as disclosed and as usable as applicable.

BRIEF DESCRIPTION OF THE DRAWINGS

Further advantages will become apparent from the following description of the drawing. In the drawing two exemplary embodiments are illustrated. The drawing, the description and the claims contain a plurality of features in combination. Someone skilled in the art will purposefully also consider the features individually and will find further expedient combinations.

It is shown in.

DETAILED DESCRIPTION

Figure 1:
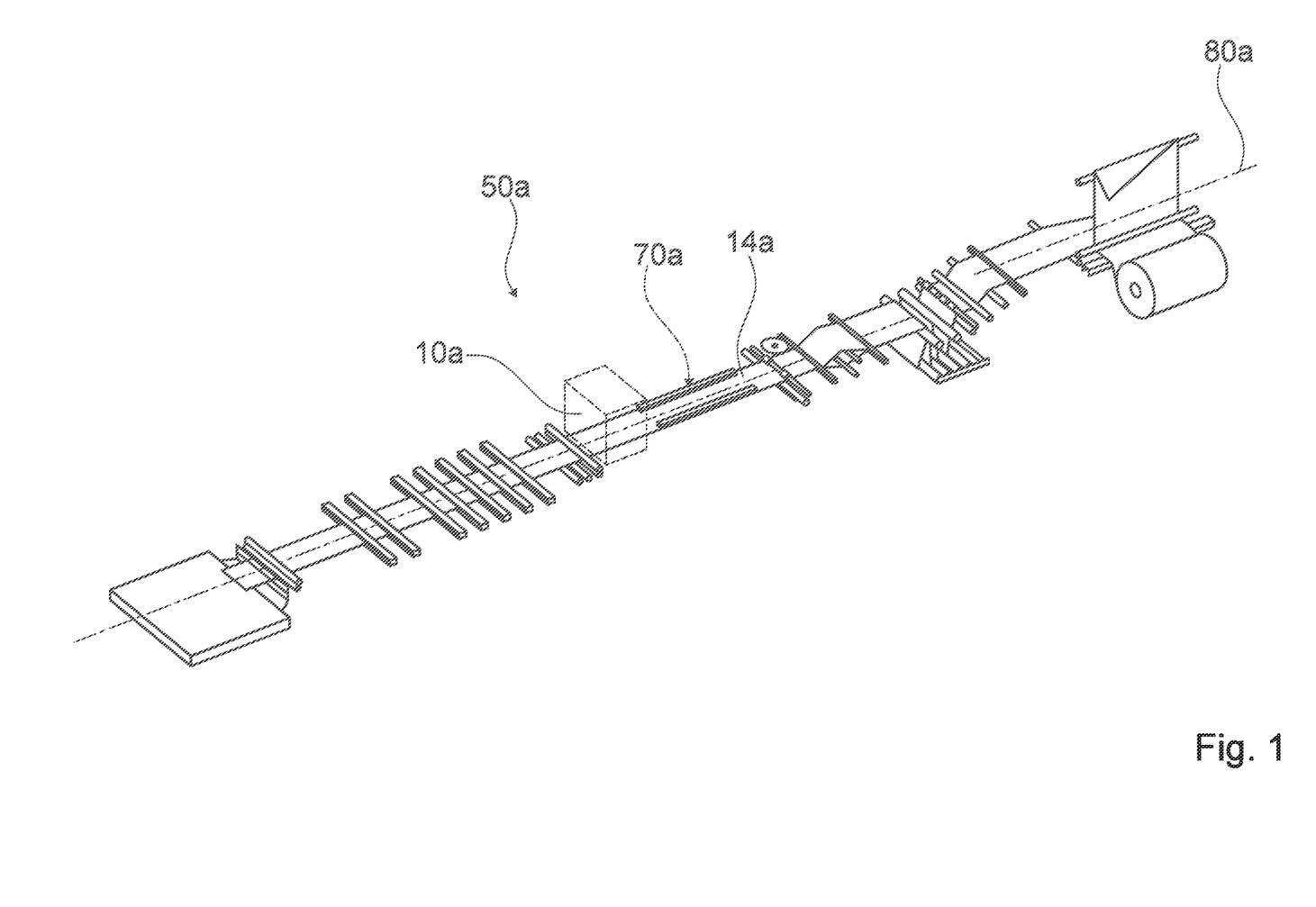
FIG. 1 a packaging machine according to the invention with a welding device according to the invention in a schematic representation, FIG. 2 the welding device according to the invention in a side view, FIG. 3 a flow chart of a method according to the invention for welding an outlet element to a packaging material, FIG. 4 a welding device according to the invention in an alternative implementation, and FIG. 5 a flow chart of a method according to the invention with the welding device according to the invention in the alternative implementation.

In FIG. 1 a packaging machine 50a for a production of packagings from a packaging material 14a with an outlet element 12a (cf. FIG. 2) is shown. The packaging machine 50a is, for example, implemented as a premanufactured-bag installation. The packaging machine 50a comprises at least one welding device 10a. The packaging material 14a forms a flat packaging matter web. Prior to a welding process, in which the outlet element 12a is welded to the packaging material 14a by means of the welding device 10a, the packaging material 14a is folded at least once. The packaging material 14a is at least configured to be unfolded at least partially by an opening angle at least prior to the welding process. The welding device 10a comprises at least one material conveying track 70a, which is configured for feeding the packaging material 14a to a welding die 22a of the welding device 10a and to an anvil 16a, and for conveying the packaging material 14a away from the welding die 22a and the anvil 16a after a welding process (cf. FIG. 2). A material conveying axis 80a of the material conveying track 70a extends at least substantially perpendicularly to a feeding direction of an outlet element feeding unit 54a of the welding device 10a and/or perpendicularly to a movement axis 72a of a movably supported support element 26a of a support unit 24a of the welding device 10a (cf. FIG. 2). The material conveying track 70a is implemented at least partially of a holding element 20a of the welding device 10a or is implemented separately from the holding element 20a (cf. FIG. 2).

Figure 2:
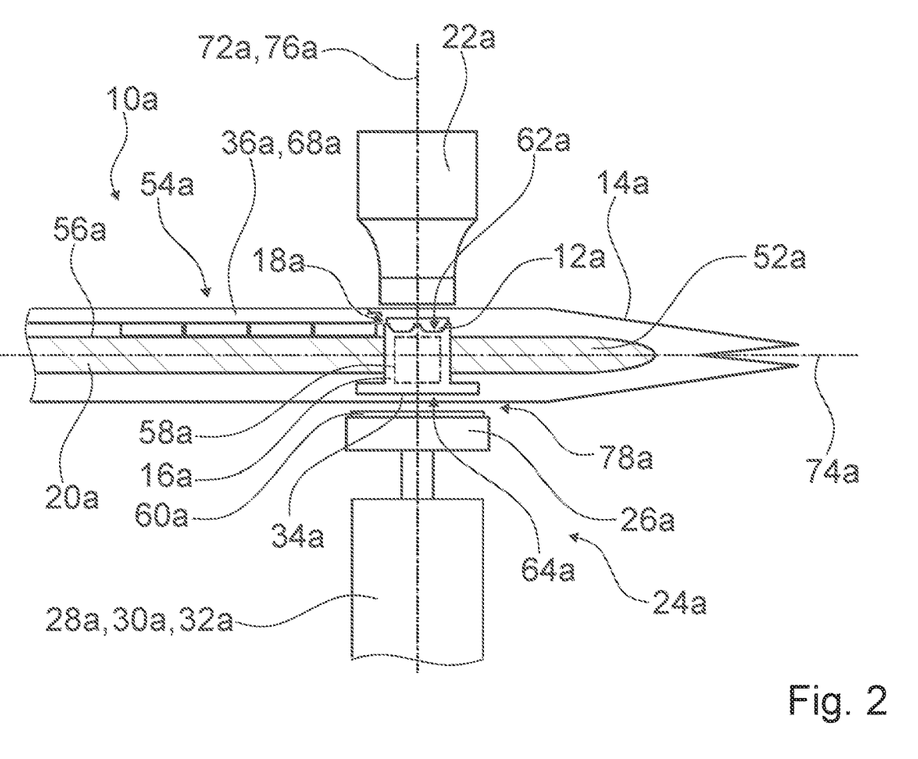

FIG. 2 shows the welding device 10a for welding the outlet element 12a to the packaging material 14a. The welding device 10a comprises the anvil 16a. The anvil 16a comprises a receiving region 18a for receiving the outlet element 12a that is to be welded. The welding device 10a further comprises the holding element 20a, which the anvil 16a is arranged on, and at least the welding die 22a, which is configured to interact with the anvil 16a for a welding of the outlet element 12a to the packaging material 14a. The welding die 22a is configured for welding the outlet element 12a to the packaging material 14a on a side of the packaging material 14a facing away from the welding die 22a. However, it is alternatively also conceivable that the welding die 22a is configured for welding the outlet element 12a to the packaging material 14a on a side of the packaging material 14a facing toward the welding die 22a. The holding element 20a is arranged between the welding die 22a and the support unit 24a. The welding device 10a comprises the support unit 24a for supporting the anvil 16a, wherein the support unit 24a comprises the movably supported support element 26a. The support element 26a is configured to exert a holding force onto the anvil 16a in a welding operation state of the welding die 22a. The support unit 24a is implemented, for example, as a hydraulic unit, as a pneumatic unit, as a servo drive unit, or something like that. The support unit 24a comprises at least one hydraulic cylinder 28a, a pneumatic cylinder 30a or a servo drive 32a for a movement of the support element 26a. The hydraulic cylinder 289a, the pneumatic cylinder 30a or the servo drive 32a is configured to move the support element 26a of the support unit 24a relative to the holding element 20a and/or to the anvil 16a. The hydraulic cylinder 289a, the pneumatic cylinder 30a or the servo drive 32a is configured to move the support element 26a along the movement axis 72a of the support element 26a.

The support element 26a is supported movably along and/or around the movement axis 72a, in particular relative to the holding element 20a and/or to the anvil 16a. The movement axis 72a of the support element 26a is aligned at least substantially perpendicularly to a main extension axis 74a of the holding element 20a. The support element 26a is supported so as to be linearly movable along the movement axis 72a. The support element 26a is embodied as a piston, in particular as a hydraulic piston, a pneumatic piston, or the like. The holding element 20a is implemented so as to be self-supporting, wherein the holding element 20a is, at least in a region of the anvil 16a, free of a fix support or of a connection point or of a bearing point. The holding element 20a has at least one free end 52a. At least viewed along the main extension axis 74a of the holding element 20a, the packaging material 14a encompasses the free end 52a of the holding element 20a. The welding device 10a is realized as an ultrasound welding device. The welding die 22a is realized as a sonotrode. It is alternatively conceivable that the welding device 10a is realized as a heat contact welding device, in particular with a heat die, as an induction welding device, as an impulse welding device, as a circular welding device, as a laser transmission welding device, or the like. The outlet element 12a is implemented as a valve, in particular as an aroma protection valve. It is also conceivable that the outlet element 12a is implemented as an outlet opening, as a closure, or the like.

The welding device 10 comprises at least the outlet element feeding unit 54a, which is configured to feed the outlet element 12a to the receiving region 18a of the anvil 16a. The receiving region 18a is arranged on an anvil upper side 62a of the anvil 16a. The anvil upper side 62a is arranged on the anvil 16a on a side of the anvil 16a that faces toward the welding die 22a. The anvil upper side 62a is arranged on the anvil 16a on a side of the anvil 16a that faces away from the support unit 24a. The receiving region 18a is implemented of the anvil upper side 62a of the anvil 16a. The receiving region 18a formed by the anvil upper side 62a is implemented in a perfect fit to the outlet element 12a. The outlet element feeding unit 54a is in at least one operation state arranged on a side of the packaging material 14a that faces away from the welding die 22a. However, it is alternatively also conceivable that the outlet element feeding unit 54a is in at least one operation state arranged on a side of the packaging material 14a that faces toward the welding die 22a. The outlet element feeding unit 54a is arranged on the holding element 20a. The outlet element feeding unit 54a comprises at least one guiding element 56a, wherein the outlet element 12a is configured, when fed into the receiving region 18a of the anvil 16a, to be guided along the guiding element 56a. The guiding element 56a is configured for guiding a plurality of outlet elements 12a. The outlet elements 12a of the plurality of outlet elements 12a form a contiguous train of outlet elements 12a. The guiding element 56a is implemented as a guiding rail. The guiding element 56a is implemented integrally with the holding element 20a. It is alternatively conceivable that the outlet element feeding unit 54a, in particular the guiding element 56a, is implemented and/or arranged separately from the holding element 20a. The feeding direction of the outlet element feeding unit 54a runs at least partly parallel to the main extension axis of the holding element 20a and at least partly perpendicularly to the movement axis 72a of the support element 26a. The feeding direction of the outlet element feeding unit 54a is oriented at least toward the free end 52a of the holding element 20a.

The anvil 16a is supported movably on the holding element 20a and can be subjected to a holding force toward the welding die 22a by means of the support element 26a. The anvil 16a is arranged between the support unit 24a and the welding die 22a. The anvil 16a is supported on the holding element 20a, for example, via a linear roller bearing, a linear slide bearing, or something like that. The anvil 16a has an anvil movement axis 76a, the anvil 16a being supported on the holding element 20a so as to be movable along and/or around the anvil movement axis 76a. The anvil movement axis 76a runs at least substantially perpendicularly to the main extension axis 74a of the holding element 20a. The anvil movement axis 76a runs at least substantially parallel to the movement axis 72a of the support element 26a of the support unit 24a. The anvil 16a is supported so as to be linearly movable along the anvil movement axis 76a. The support unit 24a is configured to move the anvil 16a into the welding position before the welding process by means of the support element 26a. It is conceivable that the relative arrangement of the anvil 16a with respect to the welding die 22a, in particular a distance from the anvil 16a to the welding die 22a, changes during the welding process, preferably due to a melting of a sealing surface of the outlet element 12a. The support unit 24a is configured to hold the anvil 16a in the welding position during the welding process by means of the support element 26a. The support unit 24a is configured to adapt, by means of the support element 26a, the relative arrangement of the anvil 16a to the welding die 22a to the melting of the sealing surface of the outlet element 12a. The anvil upper side 62a of the anvil 16a is, at least in the welding operation state, arranged spaced apart from the guiding element 56a of the outlet element feeding unit 54a, at least viewed along the anvil movement axis 76a of the anvil 16a. The support element 26a is configured, after the welding process, to move into an initial position relative to the support unit 24a. The anvil 16a is in the initial position of the support element 26a free of a force exerted by the support element 26a.

The anvil 16a is configured, after a welding process, in particular if the support element 26a is in the initial position and/or if the support element 26a does not exert a holding force onto the anvil 16a, to be moved into an outlet element feeding position. The anvil 16a comprises at least one movement unit 58a, which is at least configured for moving the anvil 16a into the outlet element feeding position. The movement unit 58a is implemented pneumatically. However, it is alternatively also conceivable that the movement unit is implemented mechanically, hydraulically, or the like. It is alternatively conceivable, for example, that the movement unit 58a comprises a spring element or something of that kind, which is configured for a resetting of the anvil 16a into the outlet element feeding position, the spring element being embodied, for example, as a spiral spring, as a leaf spring, or the like. The outlet element feeding unit 54a is configured for feeding the outlet element 12a to the receiving region 18a of the anvil 16a at least in the outlet element feeding position of the anvil 16a.

The support unit 24a is arranged relative to the holding element 20a in such a way that the packaging material 14a is arrangeable between the support element 26a and the holding element 20a. The support element 26a of the support unit 24a is arrangeable relative to the holding element 20a in such a way that the packaging material 14a is movable between the support element 26a and the holding element 20a. Between the holding element 20a and the support element 26a a gap 78a is formed, wherein the packaging material 14a is arrangeable and/or movable in the gap 78a. The anvil 16a and the support element 26a of the support unit 24a are arrangeable relative to each other such that the anvil 16a and the support element 26a are spaced apart from each other. The packaging material 14a is arrangeable between the anvil 16a and the support element 26a. The packaging material 14a is, at least during the welding process, arranged between the anvil 16a and the support element 26a. The anvil 16a is arrangeable relative to the support element 26a in such a way that the packaging material 14a is movable between the anvil 16a and the support element 26a. The packaging material 14a is movable at least between the anvil 16a and the support element 26a if the support element 26a is situated in an initial position. In the state of the support unit 24a shown in FIG. 2, the packaging material 14a is movable between the anvil 16a and the support element 26a. The packaging material 14a is configured to be moved between the anvil 16a and the support element 26a, at least between two successive welding processes. The packaging material 14a is during the welding process arranged between the welding die 22a and the holding element 20a, and between the holding element 20a and the support unit 24a. The packaging material 14a is during the welding process arranged between the anvil 16a and the welding die 22a, and between the anvil 16a and the support element 26a.

The anvil 16a comprises at least one anvil support surface 34a, which is at least configured to interact with the support element 26a for a support of the anvil 16a. A maximum extent of the anvil support surface 34a is larger than a maximum extent of the receiving region 18a of the anvil 16a. The anvil support surface 34a is arranged on the anvil 16a on a side of the anvil 16a that faces toward the support element 26a of the support unit 24a. The packaging material 14a adjoins the anvil support surface 34a at least in the welding operation state. The anvil support surface 34a is arranged on an anvil underside 64a of the anvil 16a. The anvil underside 64a of the anvil 16a is arranged facing away from the anvil upper side 62a of the anvil 16a. The support element 26a comprises at least one support surface 60a, which is at least configured to interact with the anvil support surface 34a for a support of the anvil 16a. The support surface 60a is situated opposite the anvil support surface 34a. The packaging material 14a adjoins the support surface 60a at least in the welding operation state. The anvil support surface 34a extends, at least in the welding operation state, parallel to the support surface 60a. A maximum extent of the support surface 60a corresponds to the maximum extent of the anvil support surface 34a. It is however also conceivable that the maximum extent of the anvil support surface 34a is smaller or larger than the maximum extent of the support surface 60a of the support element 26a.

The welding device 10a comprises at least one punching unit 36a, which is at least configured for severing a contiguous train of outlet elements 12a. The punching unit 36a comprises at least one further punching tool 68a, which is arranged on the holding element 20a or on the anvil 16a. The further punching tool 68a is configured to divide the contiguous train of outlet elements 12a, preferably into individual outlet elements 12a. The further punching tool 68a is fixated on the holding element 20a or alternatively on the anvil 16a. The further punching tool 68a is configured to severe the contiguous train of outlet elements 12a via a relative movement of the anvil 16a to the holding element 20a, respectively to the further punching tool 68a. An edge of the anvil 16a, respectively of the holding element 20a, forms a punching edge for the further punching tool 68a. The further punching tool 68a is embodied as a punching knife or as a punching edge. It is however conceivable that the further punching tool 68a is implemented as a different punching tool known to someone skilled in the art.

Figure 3:
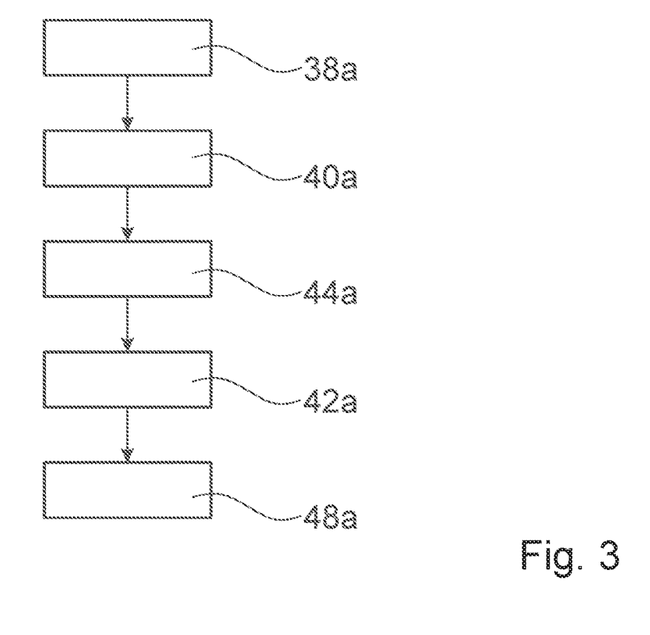

FIG. 3 shows a flow chart of a method for welding the outlet element 12a to the packaging material 14a by means of the welding device 10a. Prior to the welding process the at least once-folded packaging material 14a is unfolded by the opening angle. In at least one method step 38a the packaging material 14a, unfolded by the opening angle, is conveyed into the welding device 10a and/or is conveyed in the welding device 10a. In the at least one method step 38a the outlet element 12a is arranged in the receiving region 18a of the anvil 16a. The outlet element 12a is moved along the guiding element 56a in the feeding direction until the outlet element 12a is situated in the receiving region 18a of the anvil 18a.

In the at least one method step 38a the packaging material 14a is arranged between the anvil 16a of the welding device 10a and the support unit 24a of the welding device 10a. Before and/or after the welding process, the packaging material 14a is moved between the anvil 16a and the support unit 24a, in particular the support element 26a of the support unit 24a. The packaging material 14a is in the at least one method step 38a arranged between the anvil 16a and the welding die 22a. Before and/or after the welding process, the packaging material 14a is moved between the anvil 16a and the welding die 22a. The packaging material 14a has a packaging material movement axis, along which the packaging material 14a is moved at least before and/or after the welding process. The packaging material movement axis is given by the material conveying axis 80a and extends at least substantially perpendicularly to the movement axis 72a of the support element 26a, to the anvil movement axis 76a and/or to the feeding direction of the outlet element feeding unit 54a.

In at least one method step 40a the anvil 16a and the support element 26a of the support unit 24a are moved relative to each other. The support element 26a is in the at least one method step 40a moved along the movement axis of the support element 26a. The support element 26a is moved toward the anvil 16a, at least in order to create an operative connection of the support element 26a with the anvil 16a. Before the welding process the anvil 16a is moved into the welding position by means of the support unit 24a, in particular by means of the support element 26a of the support unit 24a.

In at least one method step 44a a contiguous train of outlet elements 12a is severed by an interaction of the support element 26a with the anvil 16a. The contiguous train of outlet elements 12a is severed via a relative movement of the anvil 16a with respect to the holding element 20a, respectively the further punching tool 68a. The contiguous train of outlet elements 12a is severed in such a way that there is at least one individual outlet element 12a present separately from the contiguous train of outlet elements 12a, the individual outlet element 12a being arranged in the receiving region 18a of the anvil 16a. The contiguous train of outlet elements 12a is moved by means of the outlet element feeding unit 54a. The contiguous train of outlet elements 12a is moved along the guiding element 56a of the outlet element feeding unit 54a, in particular along the feeding direction.

In at least one method step 42a the outlet element 12a is welded to the packaging material 14a, wherein the anvil 16a is supported by the support element 26a and the packaging material 14a is arranged between the support element 26a and the anvil 16a. The outlet element 12a is welded to the packaging material 14a in an ultrasound welding procedure. It is alternatively also conceivable that the outlet element 12a is welded to the packaging material 14a in a circular welding procedure, in a heat contact welding procedure, in particular with a heat die, in an induction welding procedure, in an impulse welding procedure, in a laser transmission welding procedure, or the like. At least during the welding process the anvil 16a is supported by the support element 26a. At least during the welding process the anvil 16a is held in the welding position by the support unit 24a. The relative arrangement of the anvil 16a to the welding die 22a during the welding process is adapted to the melting of the sealing surface of the outlet element 12a by the support unit 24a, in particular by the support element 26a. At least during the welding process the packaging material 14a is clamped-in between the anvil 16a and the support element 26a, in particular between the support surface 60a of the support element 26a and the anvil support surface 34a of the anvil 16a.

At least after the welding process, the support element 26a is moved along the movement axis 72a of the support element 26a in a direction away from the anvil 16a for the purpose of creating a distance between the anvil 16a and the support element 26a, at least in order to allow a movement of the packaging material 14a between the anvil 16a and the support element 26a. In at least one method step 48a the anvil 16a is moved into the outlet element feeding position. After the welding process the anvil 16a is moved, in particular by means of the movement unit 58a, into the outlet element feeding position. The anvil 16a is automatically moved toward the outlet element feeding position as long as the support element 26a is arranged spaced apart from the anvil 16a.

Figure 4:
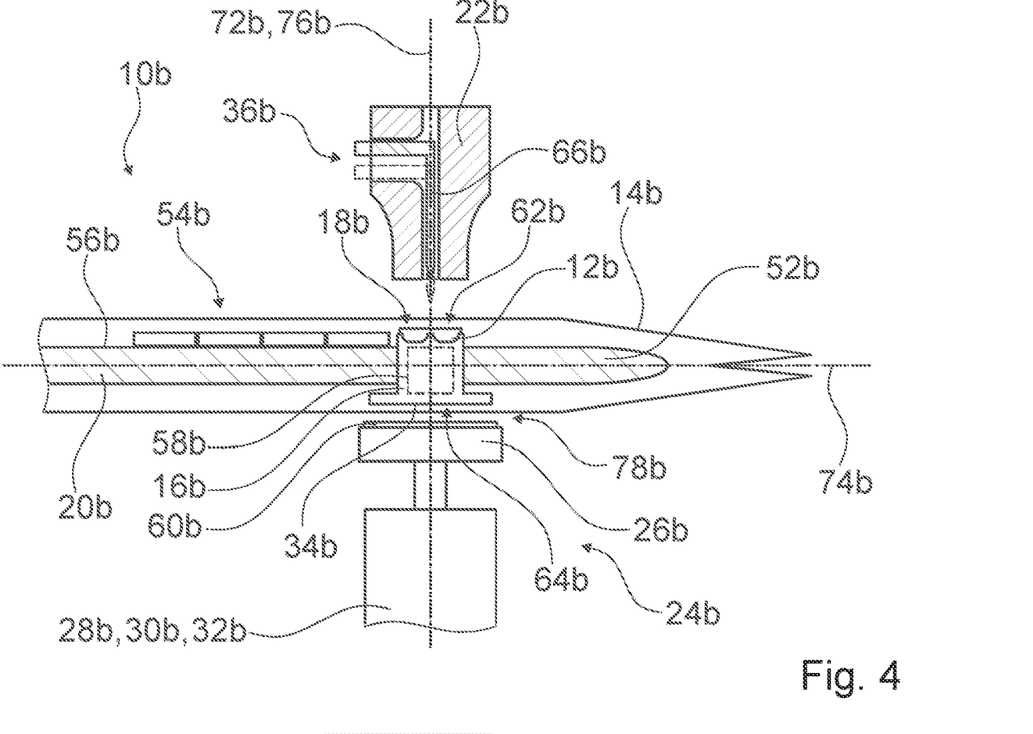
Figure 5:
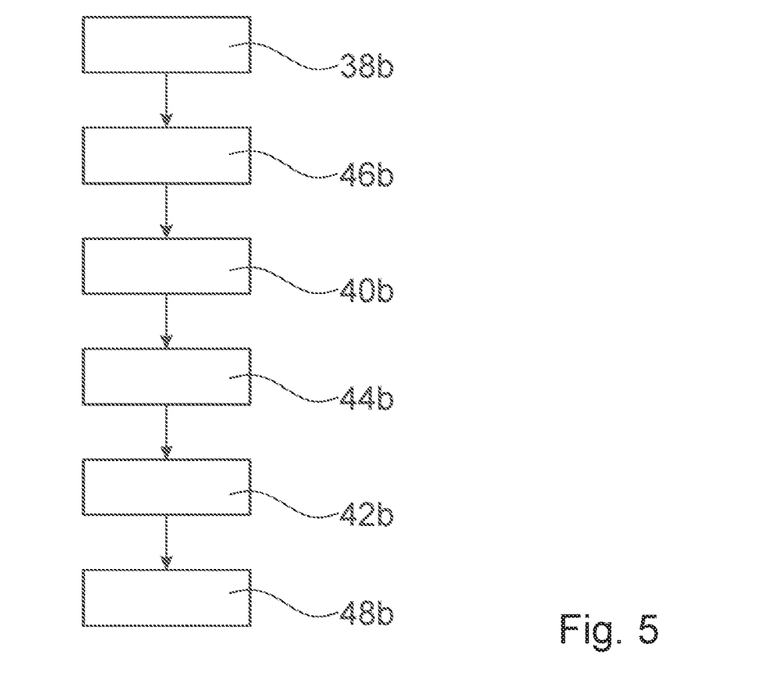

In FIGS. 4 and 5 a further exemplary embodiment of the invention is shown. The following description and the drawings are essentially limited to the differences between the exemplary embodiments, wherein regarding identically denominated components, in particular regarding components having the same reference numerals, the drawings and/or the description of the other exemplary embodiment, in particular of FIGS. 1 to 3, may principally also be referred to. In order to distinguish between the exemplary embodiments, the letter a has been added to the reference numerals of the exemplary embodiment of FIGS. 1 to 3. In the exemplary embodiment of FIGS. 4 and 5 the letter a has been substituted by the letter b.

FIG. 4 shows a welding device 10b for welding an outlet element 12b to a packaging material 14b. The welding device 10b comprises at least one anvil 16b. The anvil 16b comprises at least one receiving region 18b for receiving the outlet element 12b that is to be welded. The welding device 10b comprises at least one outlet element feeding unit 54b, which is at least configured for feeding at least the outlet element 12b to the receiving region 18b of the anvil 16b. The outlet element feeding unit 54b comprises at least one guiding element 56b, wherein the outlet element 12b is configured, when fed into the receiving region 18b of the anvil 16b, to be guided along the guiding element 56b. A plurality of outlet elements 12b lies upon the guiding element 56b. The outlet elements 12b of the plurality of outlet elements 12b are arranged on the guiding element 56b loosely relative to one another in a row one behind the other one. By means of a relative movement of the anvil 16b with respect to the holding element 20b, in each case the foremost outlet element 12b of the plurality of outlet elements 12b can be lifted and/or singulated, in particular relative to the further outlet elements 12b of the plurality of outlet elements 12b. A movement of the further outlet elements 12b at least toward the receiving region 18b of the anvil 16b is blocked by a side wall of the anvil 16b, in particular if the anvil 16b is not in an outlet element feeding position.

The welding device 10b further comprises at least one, in particular self-supporting, holding element 20b, which the anvil 16b is arranged on, and at least one welding die 22b, which is configured to interact with the anvil 16b for a welding of the outlet element 12b to the packaging material 14b. The welding device 10b comprises at least one support unit 24b for supporting the anvil 16b, wherein the support unit 24b comprises at least one movably supported support element 26b. The support element 26b is configured to exert a holding force onto the anvil 16b in a welding operation state of the welding die 22b.

The welding device 10b comprises at least one punching unit 36b, which is at least configured for introducing a perforation into the packaging material 14b. The punching unit 36b is arranged at least partially on the welding die 22b. The punching unit 36b is arranged at least partially within the welding die 22b. The welding die 22b comprises at least one recess, which the punching unit 36b is at least partially arrangeable in. It is alternatively also conceivable that the punching unit 36b is arranged at least partially on an outer side of the welding die 22b. The punching unit 36b comprises at least one punching tool 66b. The punching tool 66b is implemented as a hole-punching tool. It is however also conceivable that the punching tool 66b is implemented as a different punching tool that is known to someone skilled in the art. The punching tool 66b is supported movably on the welding die 22b. A punching tool movement axis of the punching tool 66b runs parallel to a movement axis 72b of the support element 26b and/or to an anvil movement axis 76b of the anvil 16b. The punching unit 36b is configured to introduce the perforation into the packaging material 14b by means of the punching tool 66b. For the purpose of introducing the perforation into the packaging material 14b, the punching unit 36b is configured to move the punching tool 66b relative to the packaging material 14b, in particular toward the packaging material 14b.

FIG. 5 shows a flow chart of a method for welding the outlet element 12b to the packaging material 14b by means of the welding device 10b. In at least one method step 46b a perforation is introduced into the packaging material 14b. At least in the one method step 46b the punching tool 66b of the punching unit 36b is moved relative to the welding die 22b. The punching tool 66b is moved at least in the one method step 46b toward the anvil 16b and/or toward the packaging material 14b for introducing the perforation into the packaging material 14b. The perforation is introduced into the packaging material 14b in a state when the anvil 16b is not supported by the support element 26b.

The invention claimed is:

1. A welding device (10a; 10b) for welding an outlet element (12a; 12b) to a packaging material (14a; 14b), the welding device (10a; 10b) comprising:
   at least one anvil (16a; 16b) including at least one receiving region (18a; 18b) for receiving the outlet element (12a; 12b) that is to be welded;
   a holding element (20a; 20b) on which the anvil (16a; 16b) is arranged;

at least one welding die (22a; 22b), which is configured to interact with the anvil (16a; 16b) to weld the outlet element (12a; 12b) to the packaging material (14a; 14b); and at least one support unit (24a; 24b) for supporting the anvil (16a; 16b), the support unit (24a; 24b) including at least one movably supported support element (26a; 26b), which is configured to exert a holding force onto the anvil (16a; 16b) when the welding die (22a; 22b) is in a welding operation state, wherein the movably supported support element (26a; 26b) has a movement axis (72a; 72b) along which the movably supported support element (26a; 26b) is movable relative to the anvil (16a; 16b).

2. The welding device (10a; 10b) according to claim 1, wherein the anvil (16a; 16b) is supported movably on the holding element (20a; 20b) and can be subjected to a holding force toward the welding die (22a; 22b) by the support element (26a; 26b).

3. The welding device (10a; 10b) according to claim 1, wherein the support unit (24a; 24b) comprises at least one hydraulic cylinder (28a; 28b), a pneumatic cylinder (30a; 40b), or a servo drive (32a; 32b), for moving the support element (26a; 26b).

4. The welding device (10a; 10b) according to claim 1, wherein the support unit (24a; 24b) is arranged relative to the holding element (20a; 20b) in such a way that the packaging material (14a; 14b) is arrangeable between the support element (26a; 26b) and the holding element (20a; 20b).

5. The welding device (10a; 10b) according to claim 1, wherein the anvil (16a; 16b) comprises an anvil support surface (34a; 34b), which is at least configured to interact with the support element (24a; 24b) for a support of the anvil (16a; 16b), wherein a maximum extent of the anvil support surface (34a; 34b) is larger than a maximum extent of the receiving region (18a; 18b) of the anvil (16a; 16b).

6. The welding device (10a; 10b) according to claim 1, comprising at least one punching unit (36b), which is at least configured for introducing a perforation into the packaging material (14b), wherein the punching unit (36b) is arranged at least partly on the welding die (22b).

7. The welding device (10a; 10b) according to claim 1, wherein the least one welding die (22a; 22b) is a sonotrode.

8. The welding device (10a; 10b) according to claim 1, wherein the movably supported support element (26a; 26b) is positioned on a first side of the anvil (16a; 16b) and the welding die (22a; 22b) is positioned on a second side of the anvil opposite the first side.

9. A packaging machine (50a; 50b) for a production of packagings from a packaging material (14a; 14b) with an outlet element (12a; 12b), the packaging machine (50a; 50b) comprising a welding device (10a; 10b) according to claim 1.

10. A method comprising:
welding an outlet element (12a; 12b) to a packaging material (14a; 14b) utilizing a welding device (10a; 10b) according to claim 1.

11. The method according to claim 10, further comprising arranging the packaging material (14a; 14b) between the anvil (16a; 16b) of the welding device (10a; 10b) and the support unit (24a; 24b) of the welding device (10a; 10b).

12. The method according to claim 11, further comprising moving the anvil (16a; 16b) and the support element (26a; 26b) of the support unit (24a; 24b) relative to one another.

13. The method according to claim 10, during the welding of the outlet element (12a; 12b) to the packaging material (14a; 14b), the anvil (16a; 16b) is supported by the support element (26a; 26b), and the packaging material (14a; 14b) is arranged between the support element (26a; 26b) and the anvil (16a; 16b).

14. The method according to claim 10, further comprising severing a contiguous train of outlet elements (12a; 12b) by an interaction of the support element (26a; 26b) with the anvil (16a; 16b).

15. The method according to claim 10, further comprising introducing a perforation into the packaging material (14b).

16. The method according to claim 10, further comprising moving the anvil (16a; 16b) into an outlet element feeding position.

* * * * *